US007638969B2

(12) United States Patent
Woud

(10) Patent No.: US 7,638,969 B2
(45) Date of Patent: Dec. 29, 2009

(54) CASE BATTERY WITH STORAGE DEVICE

(76) Inventor: Steven Woud, 11411 Ohio Ave., Apt #12, Los Angeles, CA (US) 90025

(*) Notice: Subject to any disclaimer, the term of this patent is extended or adjusted under 35 U.S.C. 154(b) by 144 days.

(21) Appl. No.: 11/957,268

(22) Filed: Dec. 14, 2007

(65) Prior Publication Data
US 2009/0154095 A1   Jun. 18, 2009

(51) Int. Cl.
*H02J 7/00* (2006.01)
*G06F 1/16* (2006.01)

(52) U.S. Cl. .................. 320/112; 320/107; 361/679.56

(58) Field of Classification Search ............... 320/112, 320/107, 113–115; 361/679.56
See application file for complete search history.

(56) References Cited

U.S. PATENT DOCUMENTS

2006/0125445 A1* 6/2006 Cao et al. .................. 320/112

* cited by examiner

*Primary Examiner*—Edward Tso
*Assistant Examiner*—Richard V Muralidar
(74) *Attorney, Agent, or Firm*—John K. Park; Park Law Firm

(57) ABSTRACT

A case battery with storage device is provided. The case battery comprises first and second holding portions, a charging portion, and storage devices. The first holding portion is configured to hold a first part of the personal electronic device. The second holding portion is configured to hold a second part. The charging portion is disposed in the first base plate of the first holding portion. The storage devices are disposed in one of the first base plates of the first and the second base plates of the second holding portions. The first and second holding portions are configured to enclose and hold at least part of the personal electronic device and provide additional electrical power and memory capacity to the personal electronic device.

12 Claims, 17 Drawing Sheets

CASE BATTERY WITH STORAGE DEVICE

BACKGROUND OF THE INVENTION

The present invention relates to a case battery with storage device. More particularly, this invention relates to a case battery with storage, which extends the usage time of a personal electronic device with more electrical power provided and provide more memory capacity. "Portable" is one of the keywords which define the era of the information technology. Computing power had been an obstacle to make the technology portable for a long time. Considering the first computer, it would be easy to understand the situation. With the advent of the transistors and integrated circuit, however, computing power can be crammed in a really small space such that locating the heart of a computer inside the computer or even on a mother board is not easy, actually challenging to a layman. Once the computing power became no problem for a portability, it has taken a very short time to recognize the hard fact that the power source of battery and the memory capacity are the serious problem, which seems to be much harder to solve than the CPU problem somehow. Since 1990's, portable electronic devices such as a cellular phone, PDA, etc. have become indispensable commodities to every one. The portable electronic devices need to be charged very frequently such that the usage is critically limited. Also, as the software gets more and more powerful, the need for a larger memory capacity gets higher and higher.

Accordingly, a need for a case battery with storage device for a personal electronic device or a portable personal electronic device has been present for a long time. This invention is directed to solve these problems and satisfy the long-felt need.

SUMMARY OF THE INVENTION

The present invention contrives to solve the disadvantages of the prior art.

An objective of the invention is to provide a case battery with storage device for a personal electronic device.

Another object of the invention is to provide a case battery with storage device for a personal electronic device, which can extend the usage time of the personal electronic device.

Still another object of the invention is to provide a case battery with storage device for a personal electronic device, which provides more memory capacity to the personal electronic device.

An aspect of the invention provides a case battery with storage device for a personal electronic device having a plurality of input and output devices.

The case battery comprises a first holding portion, a second holding portion, a charging portion, and one or more storage devices.

The first holding portion is configured to hold a first part of the personal electronic device and provide access at least part of the plurality of input and output devices of the personal electronic device over or through the first holding portion.

The second holding portion is configured to hold a second part of the personal electronic device and to provide access at least part of the input and output devices of the personal electronic device over or through the second holding portion.

The charging portion is disposed in the first base plate of the first holding portion, and configured to be electrically connected to a power input through a first connector so as to provide electrical power to the personal electronic device while the personal electronic device is installed.

The one or more storage devices are disposed in one of the first base plate of the first holding portion and the second base plate of the second holding portion, and each of the one or more storage devices is configured to be electrically connected to the personal electronic device through a second connector so as to be accessed by the personal electronic device while the personal electronic device is installed to the case battery.

The first and second holding portions are configured to enclose and hold at least part of the personal electronic device and provide additional electrical power and memory capacity to the personal electronic device.

The first holding portion may comprise a first base plate, a plurality of first holding walls, a first enclosing pocket, a plurality of first access holes and first access bubbles, and a first locking portion.

The first base plate may have a first end, a second end, and a plurality of side ends. The plurality of first holding walls may be extended substantially perpendicularly from some of the plurality of side ends of the first base plate. The first enclosing pocket may be provided at the first end of the first base plate. The plurality of first access holes and first access bubbles are configured to allow a user to reach some of the input and output devices of the personal electronic device. The first locking portion may be provided at the second end of the first base plate, and configured to lock the first holding portion with the second holding portion, The first receiving space configured to accept the first part of the personal electronic device may be defined by the first base plate, the plurality of first holding walls, the first enclosing pocket.

The second holding portion may be configured to be locked with the first holding portion and to be unlocked from the first holding portion so as to provide a space for the personal electronic device to be installed to or uninstalled from the case battery.

The second holding portion may comprise a second base plate, a plurality of second holding walls, a second enclosing pocket, a plurality of second access holes and second access bubbles, and a second locking portion.

The second base plate may have a first end, a second end, and a plurality of side ends. The plurality of second holding walls may be extended substantially perpendicularly from some of the plurality of side ends of the second base plate. The second enclosing pocket may be provided at the first end of the second base plate. The plurality of second access holes and second access bubbles may be configured to allow the user to reach some of the input and output devices of the personal electronic device. The second locking portion may be provided at the second end of the second base plate, and the second locking portion is configured to lock the second holding portion with the first holding portion.

A second receiving space configured to accept the second part of the personal electronic device may be defined by the second base plate, the plurality of second holding walls, and the second enclosing pocket.

The first locking portion may be configured to be locked to and unlocked from the second locking portion. The first and second locking portions may be separated when unlocked. The first and second locking portions may be kept connected by one or more connecting portions when unlocked.

The plurality of second access holes and second access bubbles may be provided on the plurality of second holding walls and the second enclosing pocket.

The plurality of first access holes and first access bubbles may be provided on the plurality of first holding walls and the first enclosing pocket. The first access holes may comprise a plurality of sound exit holes configured to guide sound from one or more speakers of the personal electronic device.

Each of the first access bubbles may comprise a flexible and transparent membrane. The input and output devices of the personal electronic device may comprise one or more game controllers, one or more speakers, a plurality of control buttons, an optical indicator, and a plurality of plug-ins.

The charging portion may comprise an electrical power acceptor configured to accept electrical power from outside. The charging portion may further comprise a secondary battery, and configured to charge the secondary battery using an external electrical power source.

The charging portion may further comprise a primary battery and a receptacle configured to accept the primary battery.

Each of the one or more storage devices may further comprise a hard disc and a flash memory.

The first holding portion may comprise a first magnetic plate provided on an edge of the first holding portion, and the second holding portion may comprise a second magnetic plate provided on an edge of the second holding portion. The first and second magnetic plates may be configured to further lock the first and second holding portions together.

The first holding portion may comprise a first electric connector provided on an edge of the first holding portion, and the second holding portion may comprise a second electric connector provided on an edge of the second holding portion. The first and second electric connectors may be configured to connect the first and second holding portions electrically.

The personal electronic device may comprise a portable game machine, a cellular phone, a PDA, a palmtop, and a GPS.

The advantages of the present invention are: (1) the case battery with storage device can extend the usage time of the personal electronic device; and (2) the case battery with storage device can provide more memory capacity to the personal electronic device.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
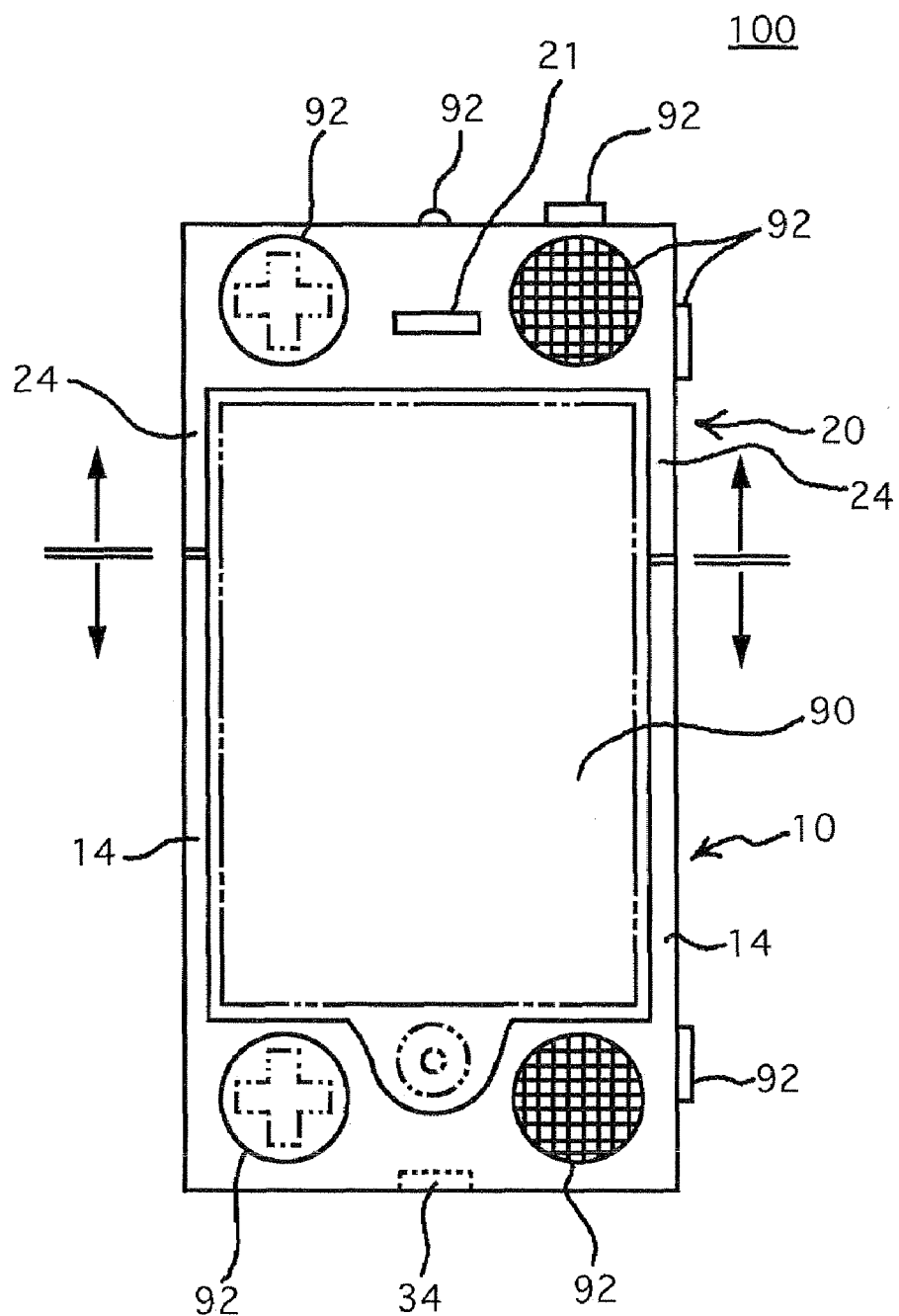
FIG. 1 is a perspective front view showing a case battery with storage device installed on a personal electronic device according to an embodiment of the present invention.
Figure 2:
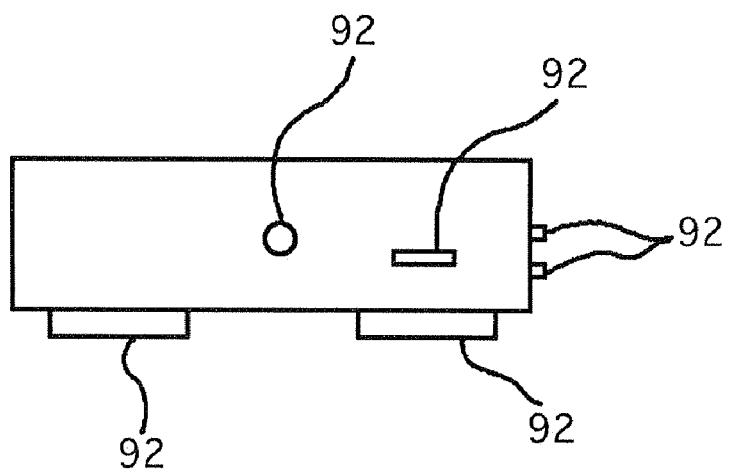
FIG. 2 is a top plan view of FIG. 1.
Figure 3:
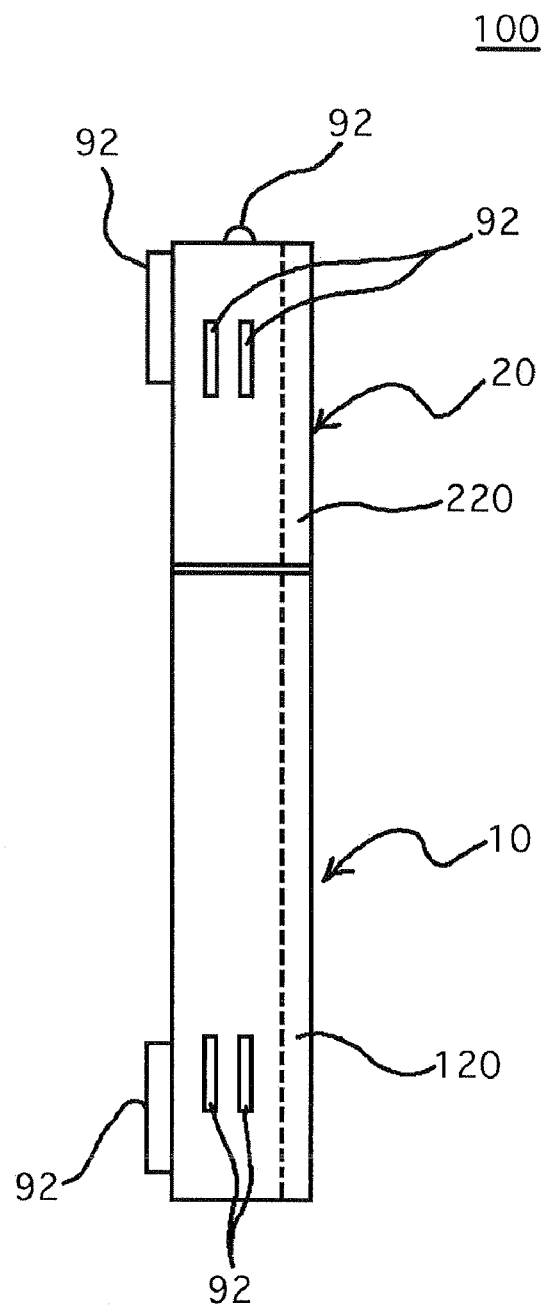
FIG. 3 is a side plan view of FIG. 1.
Figure 4:
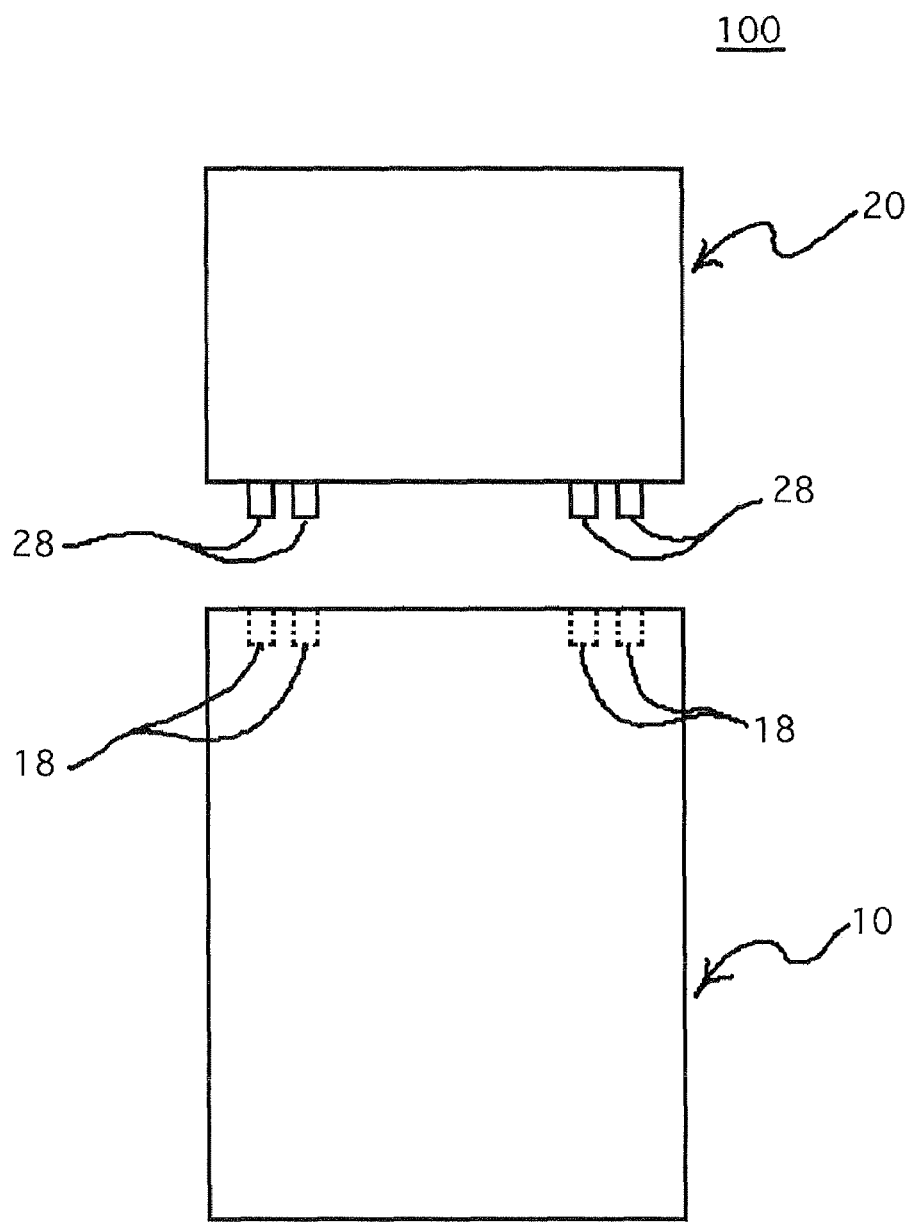
FIG. 4 is a rear plan view of FIG. 1.

FIGS. 1-7 illustrate a case battery with storage device 100 installed on a personal electronic device 90 according to an embodiment of the present invention.

An aspect of the invention provides a case battery with storage device 100 for a personal electronic device 90 having a plurality of input and output devices 92.

The case battery 100 comprises a first holding portion 10, a second holding portion 20, a charging portion 30, and one or more storage devices 40.

The first holding portion 10 is configured to hold a first part of the personal electronic device 90 and provide access at least part of the plurality of input and output devices 92 of the personal electronic device 90 over or through the first holding portion 10.

The second holding portion 20 is configured to hold a second part of the personal electronic device 90 and to provide access at least part of the input and output devices 92 of the personal electronic device 90 over or through the second holding portion 20.

The charging portion 30 is disposed in the first base plate 12 of the first holding portion 10, and configured to be electrically connected to a power input through a first connector 32 so as to provide electrical power to the personal electronic device 90 while the personal electronic device 90 is installed.

Figure 6:
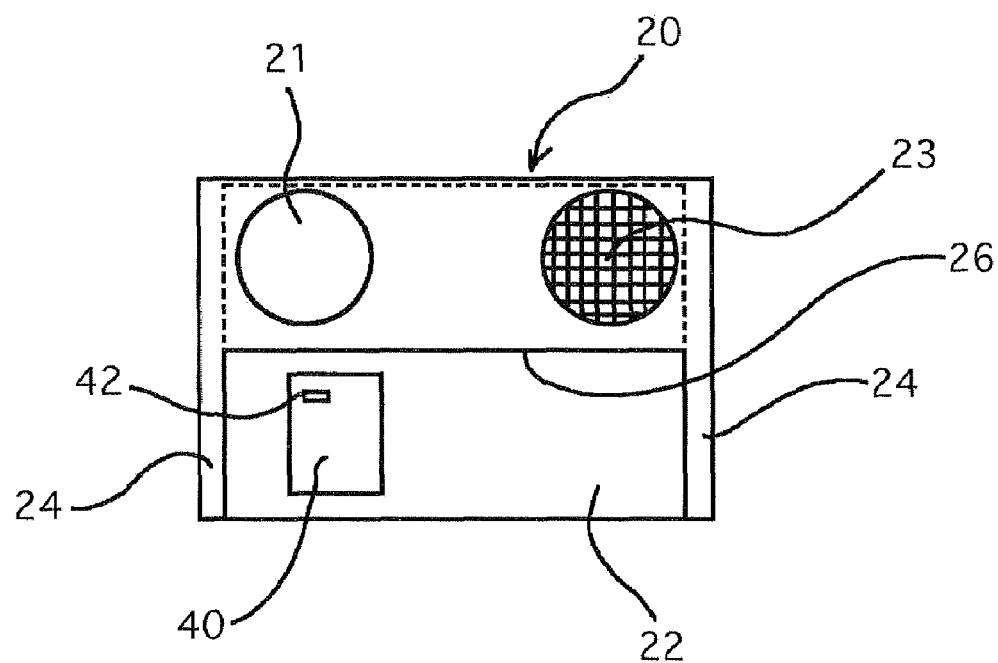
FIG. 6 is a perspective front view of a second holding portion of FIG. 1.
Figure 7:
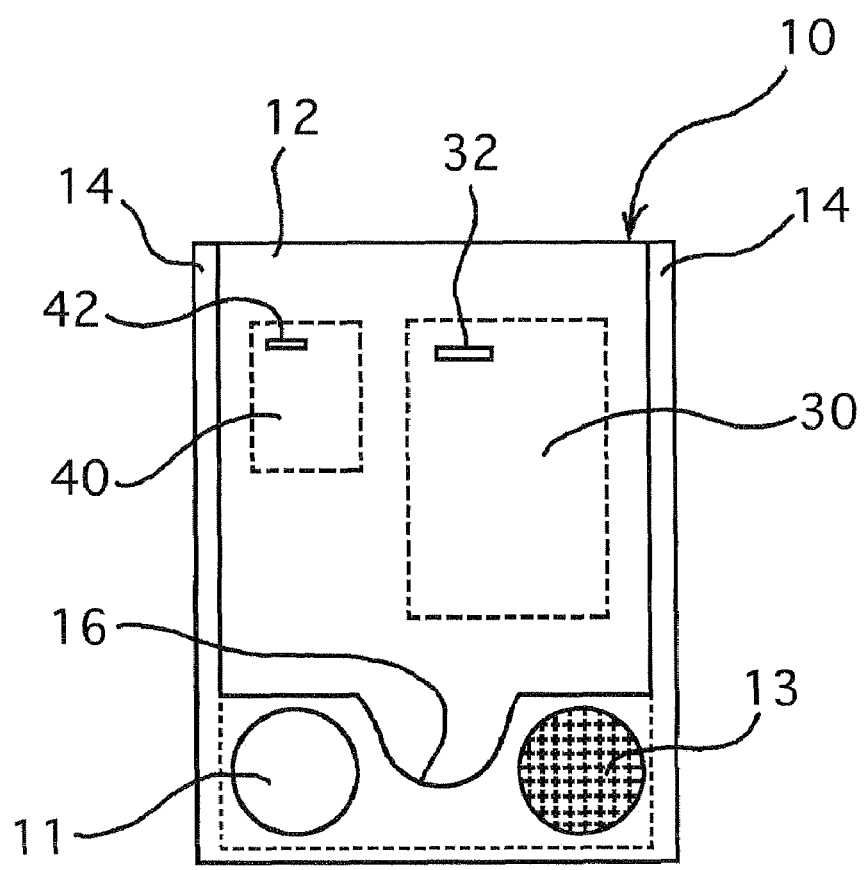
FIG. 7 is a perspective front view of a first holding portion of FIG. 1.

The one or more storage devices 40 are disposed in one or both of the first base plates 12 of the first holding portion 10 and the second base plate 22 of the second holding portion 20, and each of the one or more storage devices 40 is configured to be electrically connected to the personal electronic device 90 through a second connector 42 so as to be accessed by the personal electronic device 90 while the personal electronic device 90 is installed to the case battery 100 as shown in FIGS. 6 and 7.

The first and second holding portions 10, 20 are configured to enclose and hold at least part of the personal electronic device 90 and provide additional electrical power and memory capacity to the personal electronic device 90. In the illustrated embodiments, a part, for example a display, of the personal electronic device 90 is exposed between the first and second holding portions 10, 20.

In addition to the first base plate 12, the first holding portion 10 may comprise a plurality of first holding walls 14, a first enclosing pocket 16, a plurality of first access holes 11 and first access bubbles 13, and a first locking portion 18. The plurality of first access holes 11 are for the input and output devices 92 of the personal electronic device 90 can be reached through. And the first access bubbles 13 are for the input and output devices 92 of the personal electronic device 90 can be reached over. The input and output devices 92 includes controls, buttons, speakers, holes for connectors, etc.

The first base plate 12 may have a first end, a second end, and a plurality of side ends. The plurality of first holding walls 14 may be extended substantially perpendicularly from some of the plurality of side ends of the first base plate 12. The first enclosing pocket 16 may be provided at the first end of the first base plate 12. The plurality of first access holes 11 and first access bubbles 13 are configured to allow a user to reach some of the input and output devices 92 of the personal electronic device 90 through. The first locking portion 18 may be provided at the second end of the first base plate 12, and configured to lock the first holding portion 10 with the second holding portion 20. The first locking portion 18 may include one or more mechanical fastener or magnets.

The first receiving space 16 configured to accept the first part of the personal electronic device 90 may be defined by the first base plate 12, the plurality of first holding walls 14, and the first enclosing pocket 16.

The second holding portion 20 may be configured to be locked with the first holding portion 10 and to be unlocked from the first holding portion 10 so as to provide a space for the personal electronic device 90 to be installed to or uninstalled from the case battery 100.

The second holding portion 20 may comprise a second base plate 22, a plurality of second holding walls 24, a second enclosing pocket 26, a plurality of second access holes 21 and second access bubbles 23, and a second locking portion 28.

The second base plate 22 may have a first end, a second end, and a plurality of side ends. The plurality of second holding walls 24 may be extended substantially perpendicularly from some of the plurality of side ends of the second base plate 22. The second enclosing pocket 26 may be provided at the first end of the second base plate 22. The plurality of second access holes 21 and second access bubbles 23 may be configured to allow the user to reach some of the input and output devices 92 of the personal electronic device 90. The second locking portion 28 may be provided at the second end of the second base plate 22, and the second locking portion 20 is configured to lock the second holding portion 20 with the first holding portion 10. The plurality of second access holes 21 can be used as a hole for a digital camera of the personal electronic device 90.

A second receiving space configured to accept the second part of the personal electronic device 90 may be defined by the second base plate 22, the plurality of second holding walls 24, and the second enclosing pocket 26.

Figure 5:
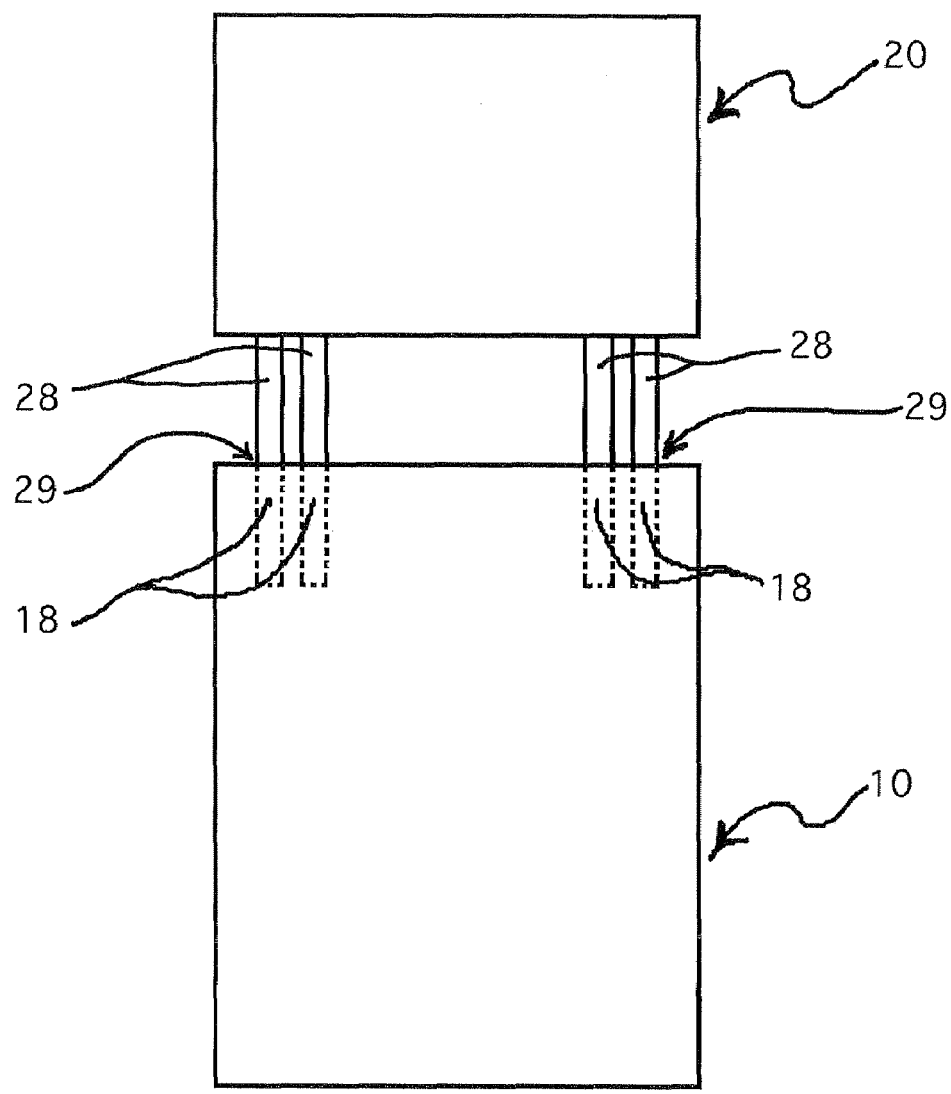
FIG. 5 is a rear plan view of the case battery with storage of FIG. 1 when first and second holding portions are extended.

The first locking portion 10 may be configured to be locked to and unlocked from the second locking portion 20. The first and second locking portions 18, 28 may be separated when unlocked. In certain embodiments, the first and second locking portions 18, 28 may be kept connected by one or more connecting portions 29 when unlocked as shown in FIG. 5. The first locking portions 18 may include a rail to guide the second locking portions 28.

The plurality of second access holes 21 and second access bubbles 23 may be provided on the plurality of second holding walls 24 and the second enclosing pocket 26.

The plurality of first access holes 11 and first access bubbles 13 may be provided on the plurality of first holding walls 14 and the first enclosing pocket 16. The first access holes 11 may comprise a plurality of sound exit holes 52 configured to guide sound from one or more speakers (not shown) of the personal electronic device 90 as shown later in FIGS. 8 and 9.

Each of the first access bubbles 13 may comprise a flexible and transparent membrane. The input and output devices 92 of the personal electronic device 90 may comprise one or more game controllers, one or more speakers, a plurality of control buttons, an optical indicator, and a plurality of plug-ins. Thereby, the input and output devices 92 of the personal electronic device 90 can be seen through and controlled without bothering about the presence of the case battery 100.

Figure 8:
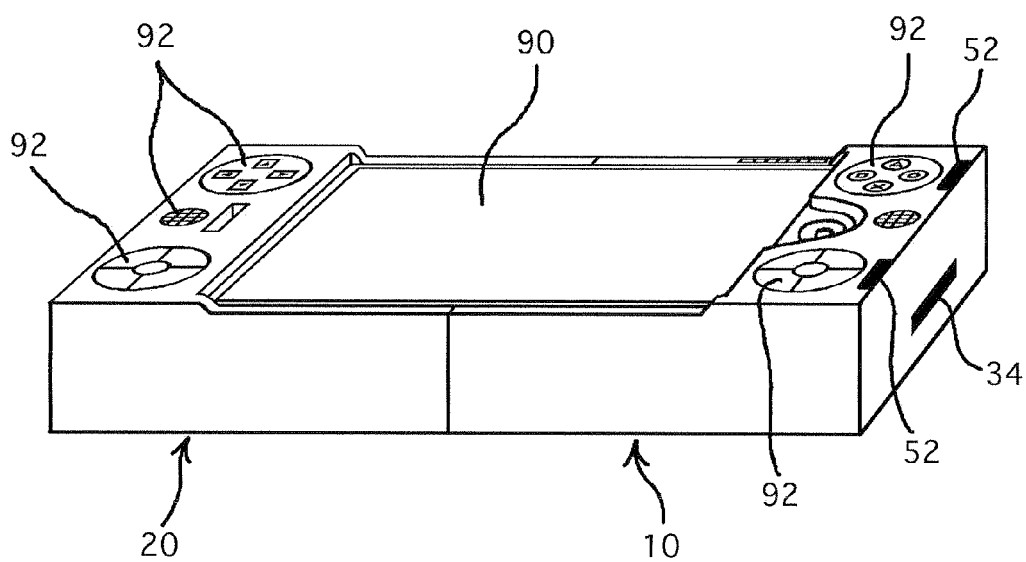
FIG. 8 is a perspective view of a case battery with storage installed on a personal electronic device according to the invention.
Figure 10:
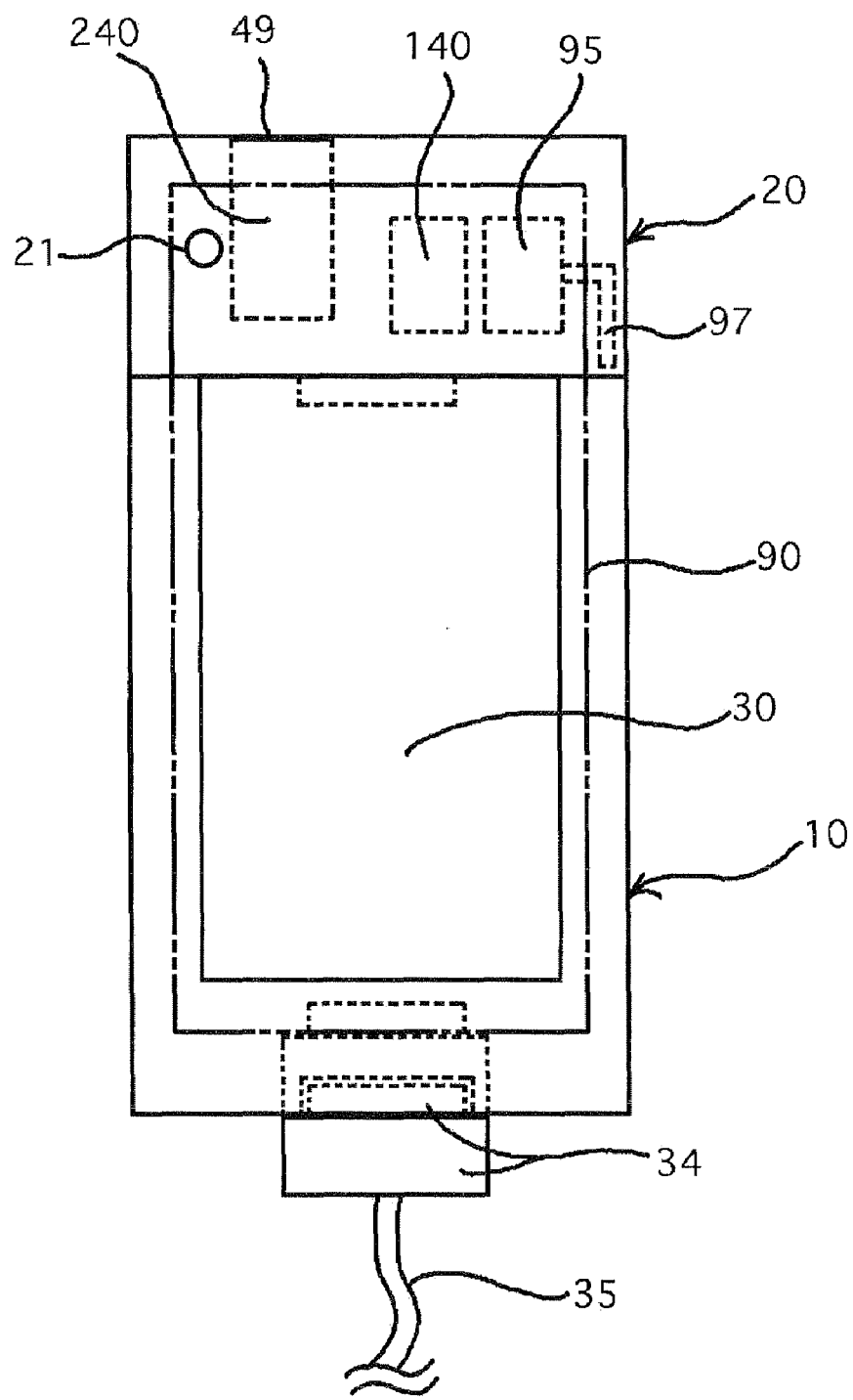
FIG. 10 is a rear plan view of FIG. 8.

The charging portion 30 may comprise an electrical power acceptor 34 configured to accept electrical power from outside as shown in FIGS. 8 and 10. The charging portion 30 may further comprise a secondary battery, and configured to charge the secondary battery using an external electrical power source, for example, through the electrical power acceptor 34 as shown in FIG. 10.

In certain embodiments of the invention, the electrical power acceptor 34 may be used to other electronic signal input and output such as for USB signal.

The charging portion 30 may further comprise a primary battery and a receptacle configured to accept the primary battery, for example, in the same location of the secondary battery.

Each of the one or more storage devices 40 may further comprise a hard disc and a flash memory.

The personal electronic device 90 may comprise a portable game machine, a cellular phone, a PDA, a palmtop, and a GPS.

FIGS. 8-12 illustrate a case battery with storage device 100 installed on a personal electronic device 90 according to another embodiment of the present invention.

Figure 9:
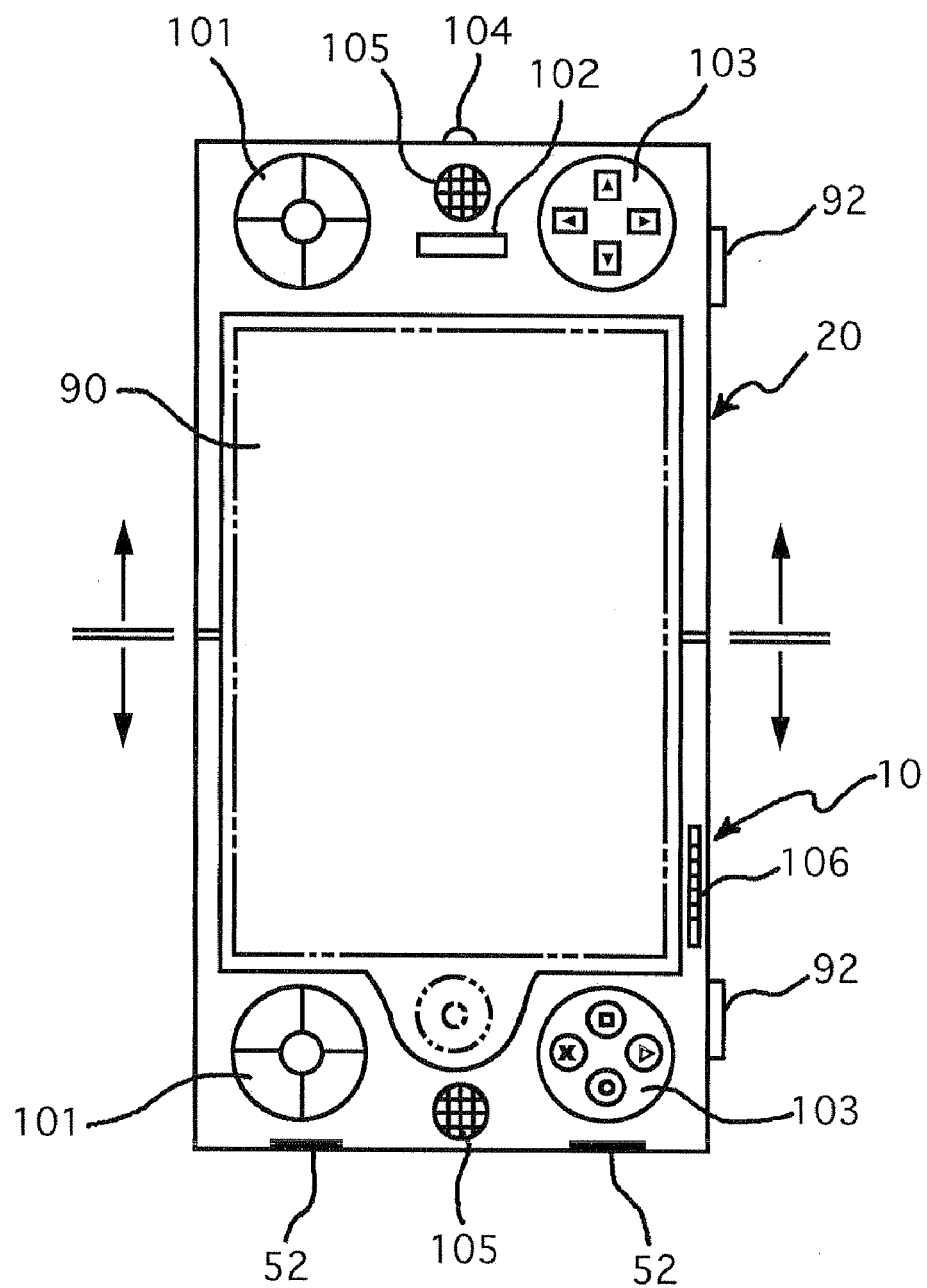
FIG. 9 is a front plan view of FIG. 8.

As shown in FIGS. 8 and 9, the input and output devices 92 may include a game control touch pad 101, a phone sound exit hole 102, game control buttons 103, an LED 104, speakers 105, a battery life indicator 106, and other buttons 92.

In the illustrated embodiment of the invention as shown in FIG. 10, the charging portion 30 may extend nearly all across bottom of the case battery 100. The memory device 40 may be disposed at a corner of the second holding portion 20. A memory device 240 may include a flash memory and a memory card. Also, the case battery 100 may include a receptacle 49 for a take-out type of memory device 140 and a fixed type of memory device 40. As discussed before, the electrical power acceptor 34 may be used to other electronic signal input and output such as for USB signal input 35. As illustrated, the case battery 100 may include one or more antennae 97, which can be used by the personal electronic device 90.

In certain embodiment, the take-out type of memory device 140 works as an internal memory for the case battery 100. The case battery 100 may further comprise a central processing unit and a memory such as RAM such that the case battery 100 installed on the personal electronic device 90 work as a computer using the personal electronic device 90 as a platform. The antennae 97 can be used by this computer for wireless connection with an outer network such as Internet.

Figure 11:
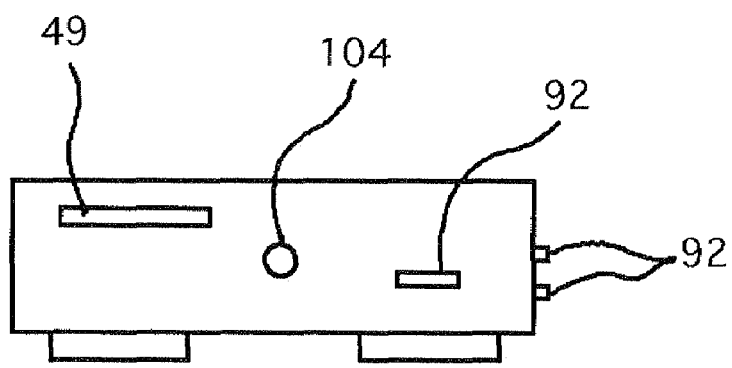
FIG. 11 is a top plan view of FIG. 8.

In certain embodiments shown in FIG. 10, the case battery 100 may further comprise a signal converter 95, which is configured to convert a signal of a first type to a signal of a second type—for example from GSM to CDMA or vice versa. FIG. 11 shows a top plan view.

For a portable game machine 90, a game title may be provided in the form of a flash memory, which can be plucked into the receptacle 49 as shown in FIGS. 10 and 11.

Figure 12:
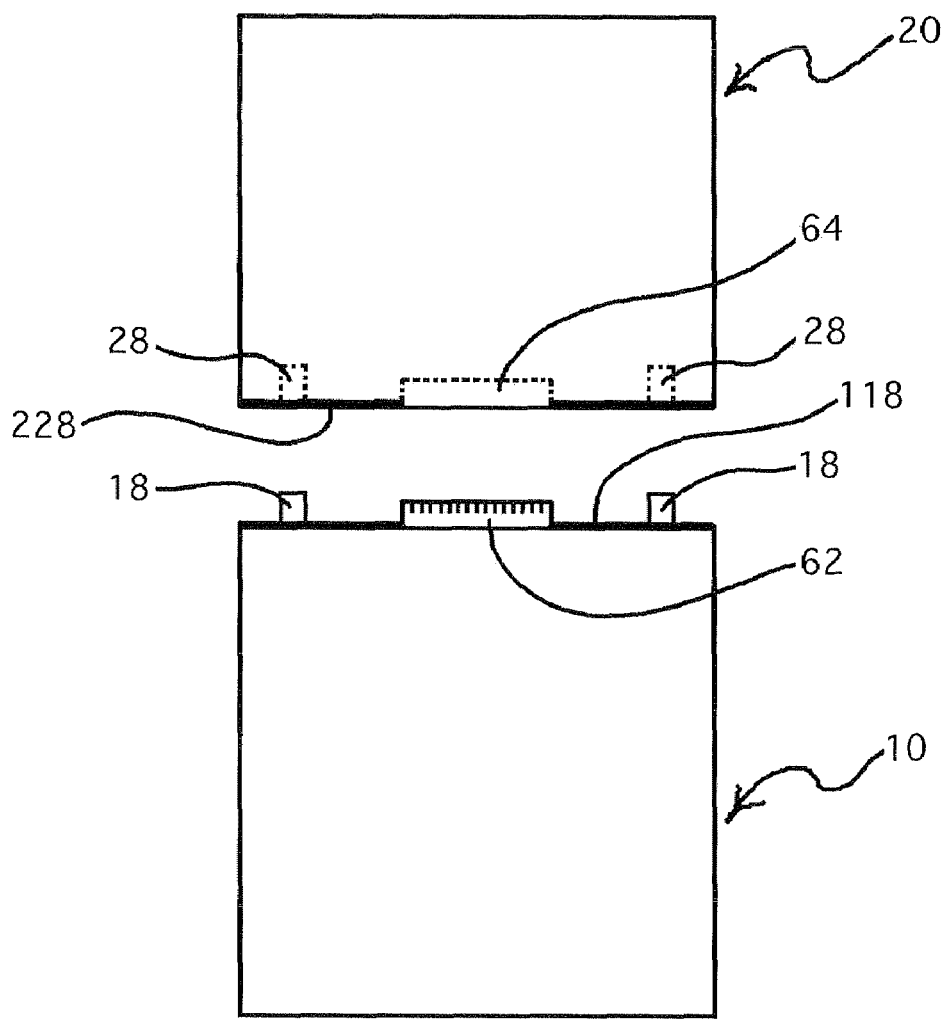
FIG. 12 shows first and second holding portions of the case battery in FIG. 8.

In certain embodiments as shown in FIG. 12, the first and second holding portions 10, 20 may be connected with additional magnetic plates 118, 228 provided on edges of the first and second holding portions 10, 20 as well as the first and second locking portions 18, 28. Also, the first and second holding portions 10, 20 can be connected electrically through a first or male connector 62 and a second or female connector 64.

Figure 13:
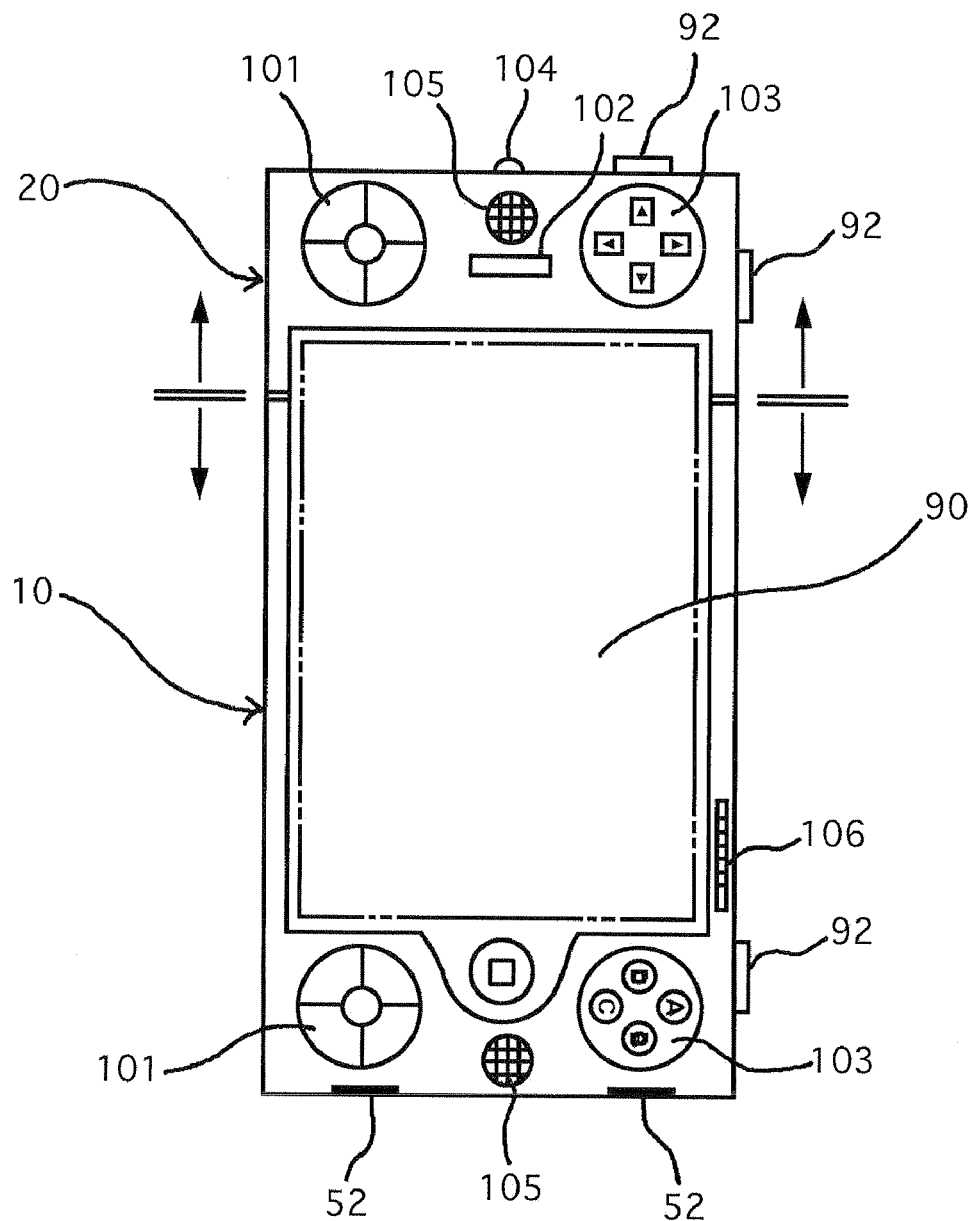
FIG. 13 is a front plan view of a case battery with storage installed on a personal electronic device according to another embodiment of the invention.
Figure 14:
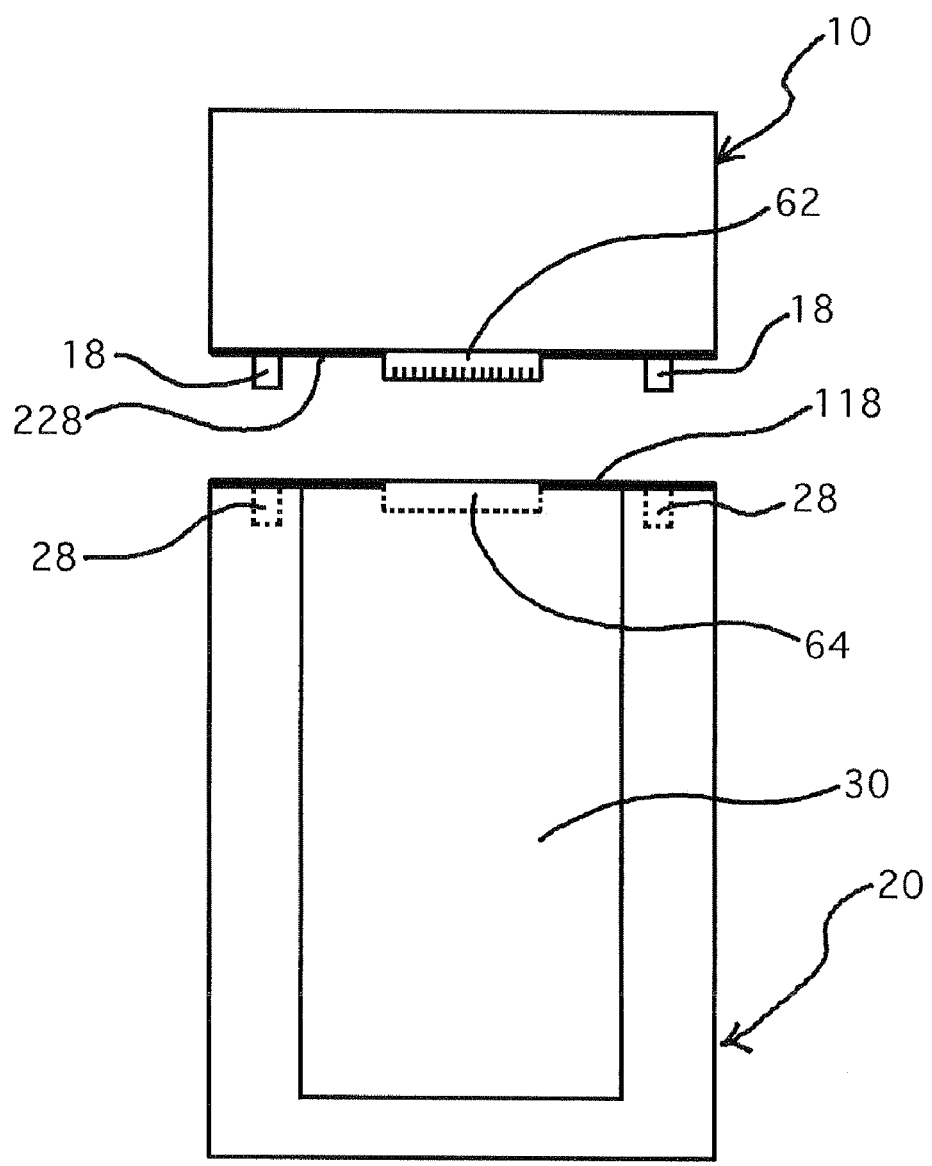
FIG. 14 is a rear plan view of the case battery with storage of FIG. 13 with first and second holding portions pulled apart.

FIGS. 13 and 14 are front and rear plan view of a case battery with storage installed on a personal electronic device according to another embodiment of the invention. The first holding portion 10 is longer than that of FIG. 9, where the first and second holding portions 10, 20 are of substantially equal length. In the illustrated embodiment, the charging portion 30 and the memory 40 can have larger capacities using more space to fit as in FIG. 7.

Figure 15:
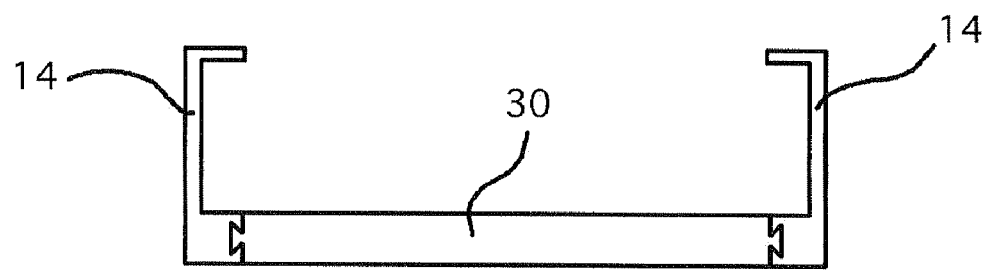
FIG. 15 is a cross-section view of a charging portion comprising a replaceable battery according to the invention.

In certain embodiments shown in FIG. 15, the charging portion 30 may comprise a replaceable battery. The replaceable battery can be taken out from the case battery 100 and charged separately. The place for charging portion 30 may be filled with a plate without any battery or memory so as to work as a regular case. There may be some situations in which the replaceable battery is taken out of the case battery 100 and charged externally.

Figure 16:
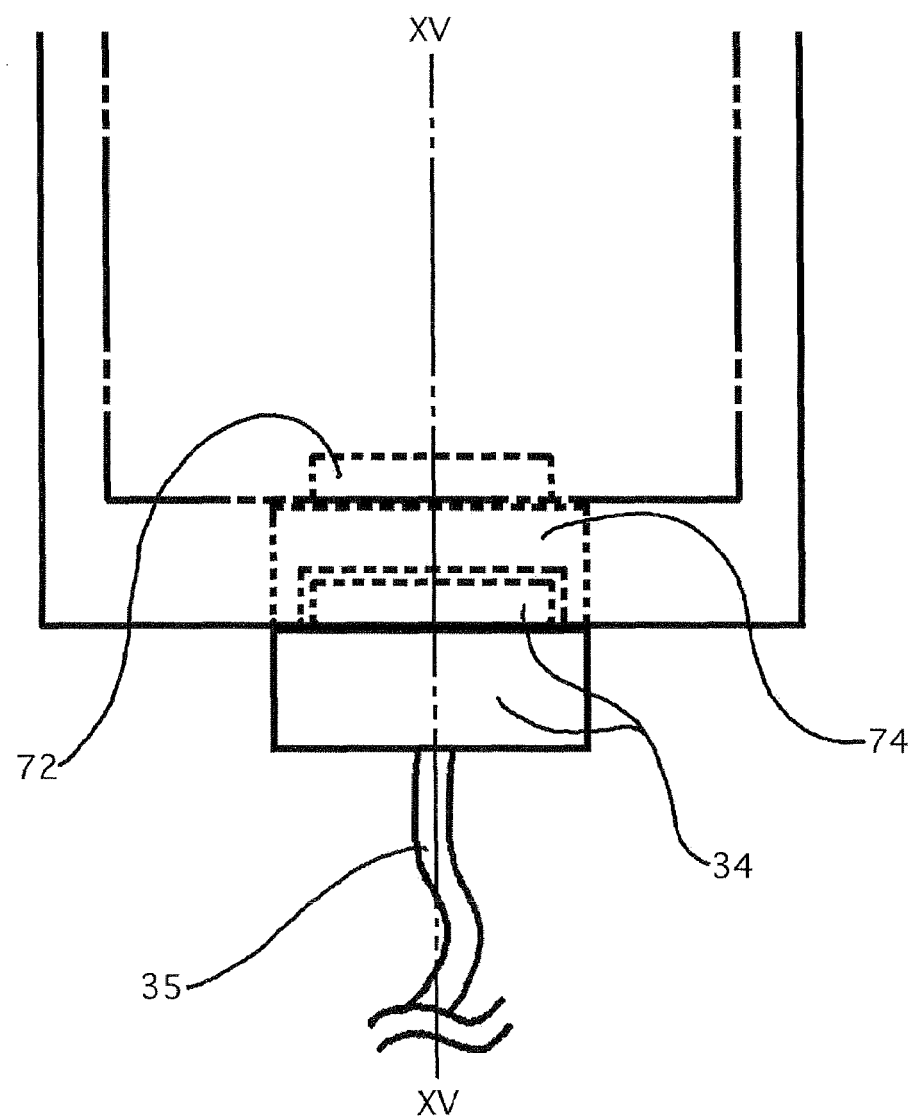
FIG. 16 is a front plan view of an electrical power acceptor and a signal input according to an embodiment of the invention.
Figure 17:
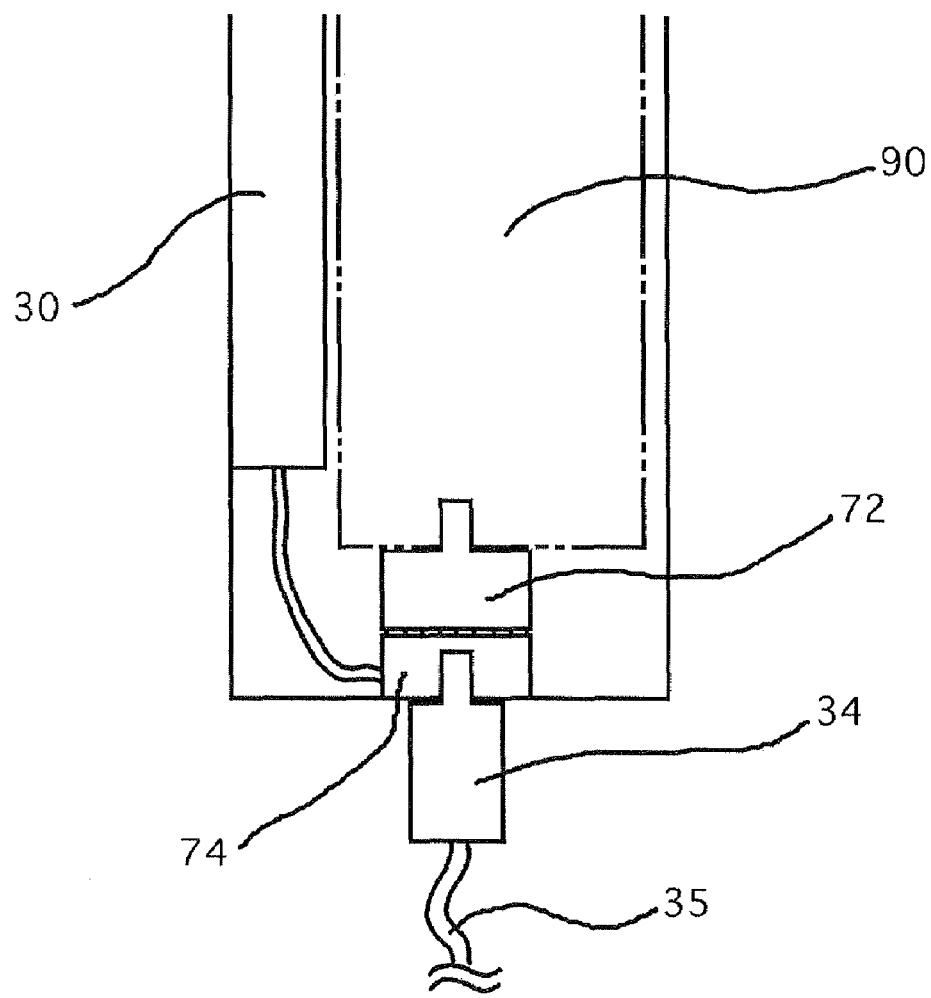
FIG. 17 is a cross-sectional view of FIG. 16 along the lines XVI-XVI.

In certain embodiments shown in FIGS. 16 and 17 the case battery 100 may further comprise another male connector 72 configured to connect the battery case 90 to the personal electronic device 90 and a female connector 74 configured to accept an external male connector such as the electrical power acceptor 35. While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A case battery with storage device for a personal electronic device having a plurality of input and output devices, the case battery comprising:
   a first holding portion, comprising a first base plate, configured to hold a first part of the personal electronic device and provide access to at least part of the plurality of input and output devices of the personal electronic device over or through the first holding portion;
   a second holding portion, comprising a second base plate, configured to hold a second part of the personal electronic device and to provide access to at least part of the input and output devices of the personal electronic device over or through the second holding portion;
   a charging portion disposed in the first base plate of the first holding portion, the charging portion being configured to be electrically connected to a power input through a first connector so as to provide electrical power to the personal electronic device while the personal electronic device is installed; and
   one or more storage devices disposed in one of the first base plate of the first holding portion and the second base plate of the second holding portion, each of the one or more storage devices being configured to be electrically connected to the personal electronic device through a second connector so as to be accessed by the personal electronic device while the personal electronic device is installed to the case battery,
   wherein the first and second holding portions are configured to enclose and hold at least part of the personal electronic device and provide additional electrical power and memory capacity to the personal electronic device.

2. The case battery of claim 1, wherein the first holding portion comprises:
   the first base plate having a first end, a second end, and a plurality of side ends;
   a plurality of first holding walls extended substantially perpendicularly from some of the plurality of side ends of the first base plate;
   a first enclosing pocket provided at the first end of the first base plate;
   a plurality of first controllers configured to be connected to the personal electronic device;
   a plurality of first speakers configured to be connected to the personal electronic device; and
   a first locking portion provided at the second end of the first base plate, wherein the first locking portion is configured to lock the first holding portion with the second holding portion,
   wherein a first receiving space configured to accept the first part of the personal electronic device is defined by the first base plate, the plurality of first holding walls, the first enclosing pocket, wherein the second holding portion is configured to be locked with the first holding portion and to be unlocked from the first holding portion so as to provide a space for the personal electronic device to be installed to or uninstalled from the case battery,
   wherein the second holding portion comprises:
   the second base plate having a first end, a second end, and a plurality of side ends;
   a plurality of second holding walls extended substantially perpendicularly from some of the plurality of side ends of the second base plate;
   a second enclosing pocket provided at the first end of the second base plate;
   a plurality of first controllers configured to be connected to the personal electronic device;
   a plurality of first speakers configured to be connected to the personal electronic device; and
   a second locking portion provided at the second end of the second base plate, wherein the second locking portion is configured to lock the second holding portion with the first holding portion,
   wherein a second receiving space configured to accept the second part of the personal electronic device is defined by the second base plate, the plurality of second holding walls, and the second enclosing pocket.

3. The case battery of claim 2, further comprising:
   a plurality of first access holes and first access bubbles configured to allow a user to reach some of the input and output devices of the personal electronic device; and
   a plurality of second access holes and second access bubbles configured to allow the user to reach some of the input and output devices of the personal electronic device, wherein the plurality of access holes and bubbles are provided on the plurality of holding walls and the enclosing pockets,
   wherein the first access holes comprise a plurality of sound exit holes configured to guide sound from one or more speakers of the personal electronic device, wherein each of the first access bubbles comprises a flexible and transparent membrane.

4. The case battery of claim 3, wherein the input and output devices of the personal electronic device comprise one or more game controllers, one or more speakers, a plurality of control buttons, an optical indicator, a plurality of plug-ins, and a digital camera.

5. The case battery of claim 1, wherein the first and second locking portions are separated when unlocked.

6. The case battery of claim 1, further comprising:
   a transceiver configured to communicate information with the personal electronic device or other external electronic devices; and one or more antennae configured to transmit or receive signals from the personal electronic device or other external electronic devices.

7. The case battery of claim 1, wherein the charging portion comprises an electrical power acceptor configured to accept electrical power from outside, wherein the charging portion further comprises:
   a secondary battery, and wherein the electrical power acceptor is configured to charge the secondary battery using an external electrical power source; and
   a primary battery and a receptacle configured to accept the primary battery.

8. The case battery of claim 1, wherein each of the one or more storage devices further comprises a hard disc and a flash memory, and wherein the personal electronic device comprises a portable game machine, a cellular phone, a PDA, a palmtop, and a GPS.

9. The case battery of claim 1, wherein the first holding portion comprises a first magnetic plate provided on an edge of the first holding portion, wherein the second holding portion comprises a second magnetic plate provided on an edge of the second holding portion, and wherein the first and second magnetic plates are configured to further lock the first and second holding portions together, wherein the first holding portion comprises a first electric connector provided on an edge of the first holding portion, wherein the second holding portion comprises a second electric connector provided on an edge of the second holding portion, and wherein the first and second electric connectors are configured to connect the first and second holding portions electrically.

10. The case battery of claim 1, further comprising:
    an electrical power acceptor configured to charge the charging portion and the battery of the personal electronic device using an external electrical power source;
    an electronic signal input and output configured to communicate information with the personal electronic device and other external electronic devices; and
    a control circuitry configured to control charging and discharging of the charging portion and the battery of the personal electronic device,
    wherein the electric power acceptor is integrated with the electric signal input and output,
    wherein the control circuitry is further configured to use the charging portion first and then the battery.

11. The case battery of claim 1, further comprising:
    a central processing unit; and
    a memory,
    wherein the central processing unit and the memory are connected electrically to the personal electronic device so as to work as a computing device.

12. The case battery of claim 1, further comprising a signal converter configured to convert a signal of a first type to a signal of a second type, wherein each of the first type and the second type comprises GSM and CDMA.

* * * * *